United States Patent [19]

Swersey

[11] Patent Number: 4,807,558

[45] Date of Patent: Feb. 28, 1989

[54] SCALE ASSEMBLY

[75] Inventor: Burt L. Swersey, Scarsdale, N.Y.

[73] Assignee: Cobe ASDT, Inc., Elmsford, N.Y.

[21] Appl. No.: 195,507

[22] Filed: May 18, 1988

[51] Int. Cl.[4] .................... G01G 19/00; G01G 21/22
[52] U.S. Cl. ..................................... 177/145; 177/262
[58] Field of Search ................................ 177/145, 262

[56] References Cited

U.S. PATENT DOCUMENTS 3,961,675  6/1976  Siegel ............................ 177/145 X
4,281,730  8/1981  Swersey et al. ................ 177/145 X Primary Examiner—George H. Miller, Jr.
Attorney, Agent, or Firm—Kenyon & Kenyon

[57] ABSTRACT

The scale for weighing bed-ridden patients includes two assemblies each of which has a pair of rollers mounted on a load frame upon which the entire bed can be elevated. The bed frame has two pairs of ramps mounted on an underside whereby the bed can be rolled onto the rollers. Each ramp has inclined surfaces to cause lifting of the bed onto the rollers of the scale assemblies.

16 Claims, 4 Drawing Sheets

SCALE ASSEMBLY

This invention relates to a scale assembly. More particularly, this invention relates to a scale for weighing bed-ridden patients.

Heretofore, various types of scales have been known for weighing bed-ridden patients. For example, U.S. Pat. No. 4,281,730 describes a scale which employs two units each of which is comprised of a support frame and a load frame mounted on the support frame for receiving a load, for example, two legs of a bed, via a pair of ramps onto which the legs of the bed can be rolled during a weighing procedure.

In the past, hospital personnel have sometimes experienced difficulty in rolling a bed onto the platform scale units such as those described in U.S. Pat. No. 4,281,730. This, in part, has been caused by the fact that the ramps have usually been elevated above the floor a small distance, in order to permit a vertical excursion to obtain a weight reading of the bed when mounted thereon.

Accordingly, it is an object of the invention to permit a rapid mounting of a hospital bed on a scale.

It is another object of the invention to facilitate the rolling of a bed onto a scale.

It is another object of the invention to permit a hospital bed to be rolled onto or off a scale while a patient is in bed.

It is another object of the invention to conveniently weigh a bed-ridden patient.

It is another object of the invention to reduce the size and bulk of existing scale assemblies of bed weighing scales.

Briefly, the invention provides a scale assembly for a scale for weighing loads, such as hospital beds. In particular, the invention provides a scale having a pair of assemblies each of which comprises a housing, a load frame movably mounted in the housing and load-support means in the form of a pair of rollers mounted on the load frame at opposite ends thereof for receiving a load thereon. In addition, the scale cooperates with a bed having a frame to which a plurality of ramps are secured. The ramps are secured to the underside of the bed frame in positions so that as the bed is moved, the ramps engage on the rollers and the bed is lifted for weighing purposes.

When the bed is mounted on the scale assemblies, each ramp is mounted on a respective roller for supporting the bed above a floor, that is, in an elevated manner in order to transfer the loading of the bed onto the rollers and, thereby, onto the scale.

Each ramp is formed with a downwardly inclined surface so that when the bed is pushed onto a respective roller, the bed is lifted from the floor into an elevated position. In addition, at least one ramp has a recess adjacent to the inclined surface for receiving a respective roller therein in order to hold the bed relative to the scale assemblies during a weighing operation.

The bed may have any suitable means for supporting the bed frame on a floor, for example, a plurality of wheels. In this case, the wheels may be disposed laterally outside of the rollers of the respective scale assembly. Thus, the distance between a pair of rollers can be reduced with a corresponding reduction in the overall weight and mass of the load frame.

Each scale assembly is also provided with a suitable load measuring means which is responsive to the movement of the load frame for measuring a load thereof. For example, a load measuring means as described in U.S. Pat. No. 4,281,730 may be used.

When in use, the scale assemblies are placed on the floor, under the bed and adjacent the ramps on the underside of the bed. The bed is then moved via the wheels thereof towards the aligned ramps until the ramps contact the rollers of the scale assemblies. As movement continues, the bed-mounted ramps start to lift the bed from the floor until the wheels are no longer load-bearing. At this point, all of the load of the bed is taken by the rollers of the scale assemblies. The bed and any patient therein can then be weighed with great convenience and great precision.

If the bed is rolled up the ramps prior to adding the patient, the weight of the patient and subsequent weight changes can be easily determined with precision.

The arrangement of the ramps on the bed frame and the rollers on the load frame of the scale assembly makes the bed extremely easy to roll onto the scale. Further, the arrangement allows the bed to be quickly and gently rolled off the scale without jolting the patient.

The overall scale can be made considerably lighter than weighing systems which use the wheels of a bed as the load support points. Further, the rollers of the scale can be brought inboard, i.e. under the bed frame, so as to greatly reduce the load frame length necessary to support the bed.

Further, the ramps can be readily attached to existing hospital beds to facilitate use with the scale assemblies of the scale. Also, the ramps may be made integral with the bed frame to avoid the need for separate attachment.

These and other objects and advantages of the invention will become more apparent from the following detailed description taken in conjunction with the accompanying drawings wherein:

FIG. 5 illustrates a part cross-sectional end view of a bed mounted on a scale assembly in accordance with the invention.

Figure 1:
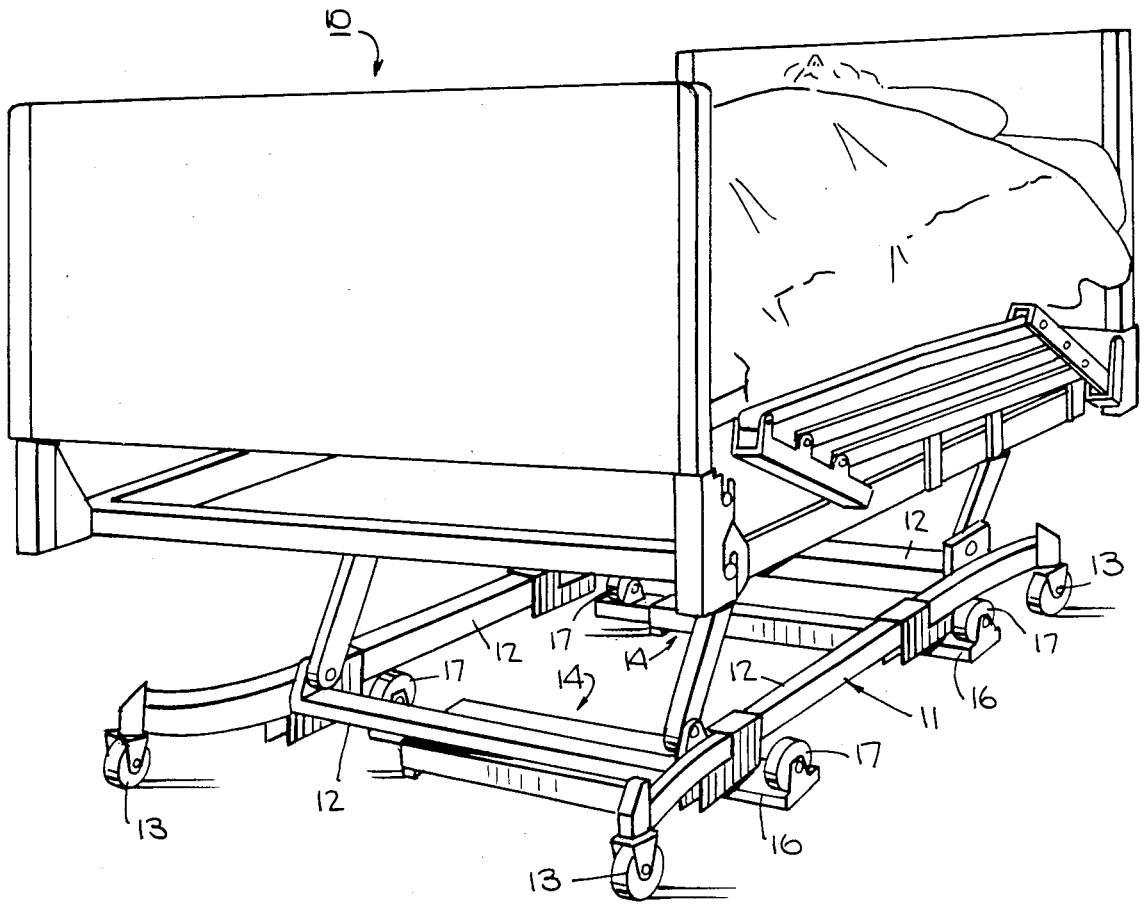
FIG. 1 illustrates a perspective view of a scale and bed arrangement in accordance with the invention.

Referring to FIG. 1, the bed 10 is a hospital bed of conventional structure. To this end, the bed 10 includes a frame 11 formed of a rectangular array of support tubes or bars 12 or the like and means in the form of wheels 13 mounted in depending fashion from the frame 11 in order to support the bed frame 11 on a floor F (see FIG. 3). The scale is formed of a pair of scale assemblies 14 which are of substantially identical structure.

Figure 2:
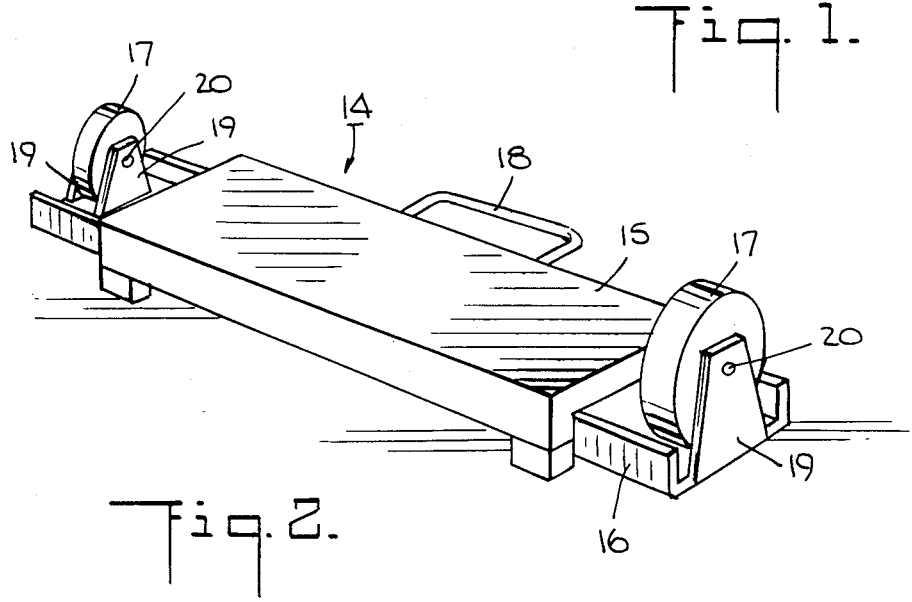
FIG. 2 illustrates a perspective view of a scale assembly constructed in accordance with the invention.

Referring to FIG. 2, each scale assembly 14 includes a housing 15 of elongated rectangular shape for disposition on the floor F (see FIG. 3), a load frame 16 which is movably mounted in the housing 15 for vertical movement under a load, a load measuring means (not shown) which is responsive to the movement of the load frame 16 for measuring a load thereon and load-support means in the form of a pair of rollers 17 mounted on the load frame 16 at opposite ends thereof.

As indicated, each housing 15 has a handle 18 secured thereto to permit ease of portability of the scale assembly 14.

The load frame 16 is in the form of a channel-shaped beam which extends from the housing 15 at each end. In addition, a pair of brackets 19 of generally triangular shape are secured, as by bolts to the load frame 16 along with a pivot pin 20 for rotatable mounting of a roller 17 thereon.

The load measuring means (not shown) and the remainder of each scale assembly 14 are constructed in a manner similar to the scale described in U.S. Pat. No. 4,281,730 and need not be further described.

Figure 4:
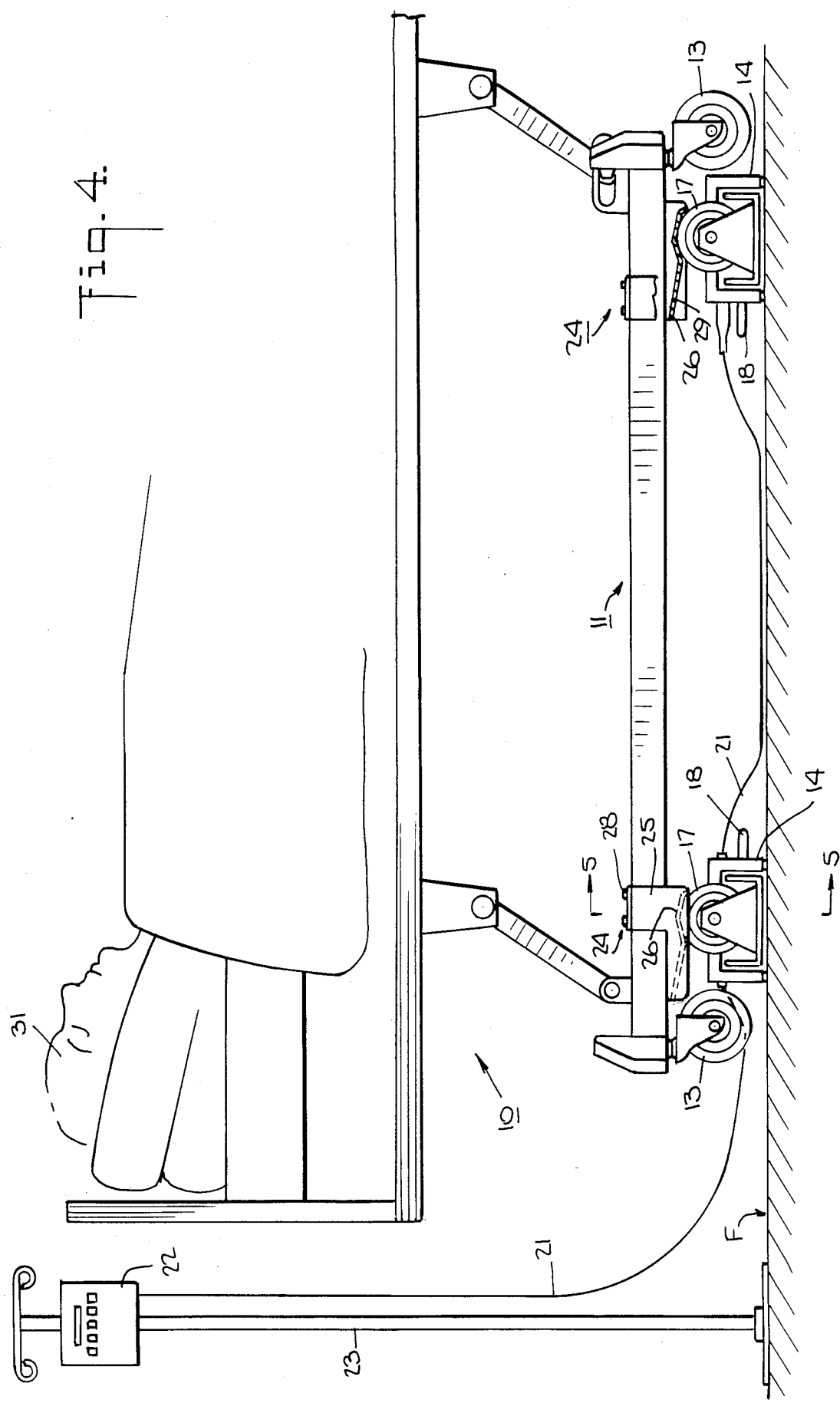
FIG. 4 illustrates a bed mounted on the scale assemblies in accordance with the invention in a weighing position.

As indicated in FIG. 4, the scale assemblies 14 are connected through suitable electronic cables 21 to each other and to a read-out 22 in the form of an electronic digital read-out 22, which is mounted, for example, on an upstanding support 23 such as a pole.

Figure 6:
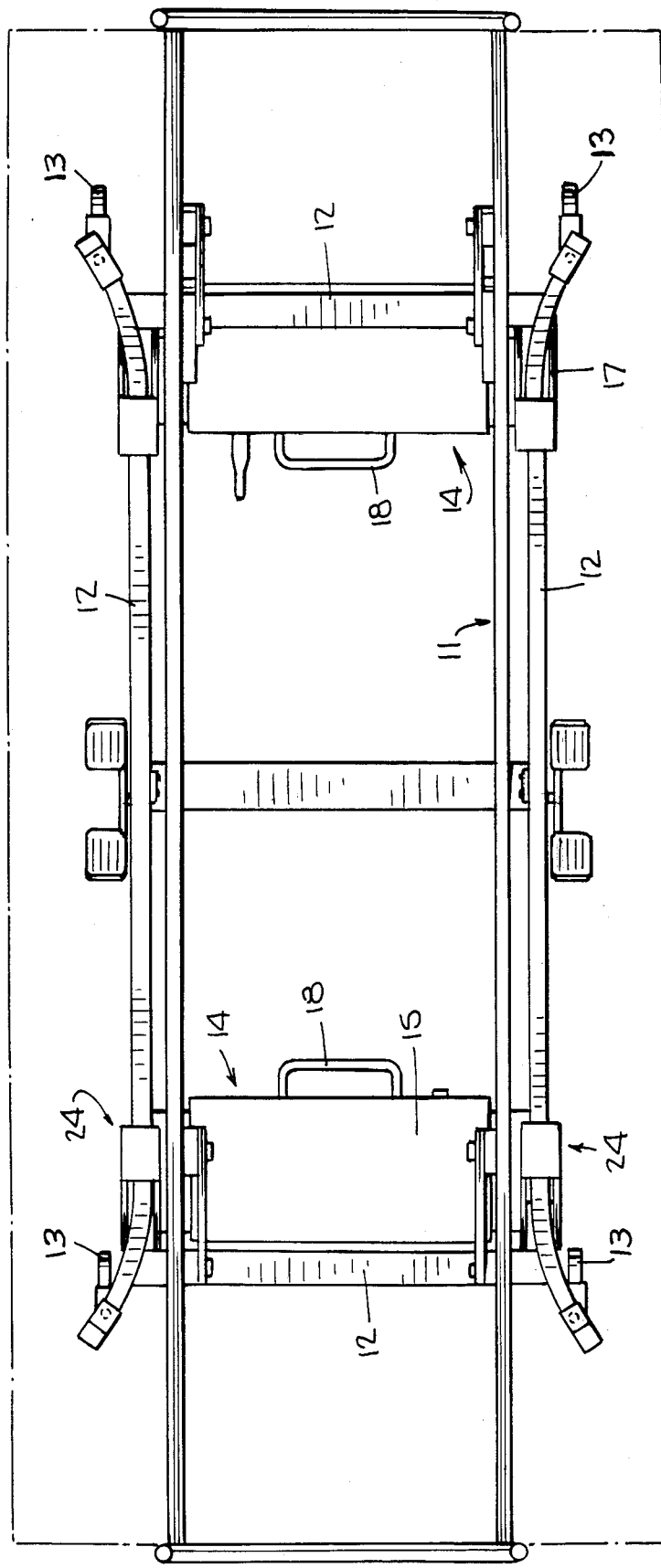
FIG. 6 illustrates a plan view of a bed and scale arrangement in accordance with the invention.

Referring to FIGS. 1 and 6, the wheels 13 for supporting the bed 10 on the floor F are disposed laterally outside of the rollers 17 of the scale assemblies 14. That is, the rollers 17 are situated inboard of the wheels 13. Thus, the overall length of a load frame 16 can be reduced to a minimum.

Figure 3:
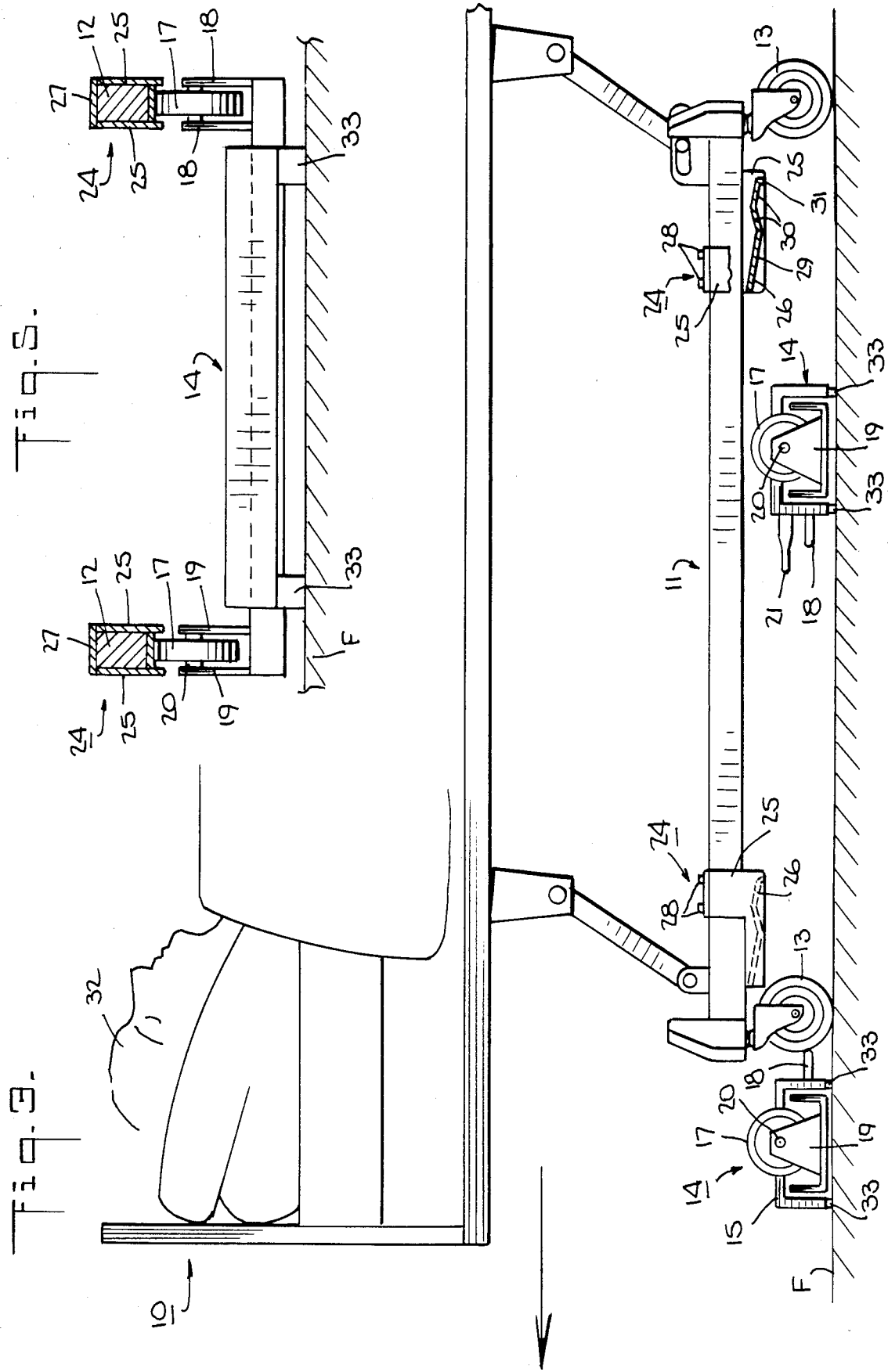
FIG. 3 illustrates a partial side view of the bed and scale arrangement in accordance with the invention.

Referring to FIGS. 3 and 5, the bars 12 of the bed frame 11 are provided with a plurality of ramps 24, i.e. four ramps. As indicated in FIG. 6, the ramps 24 are mounted near the four corners of the bed frame 11. Each ramp 24 includes a pair of side plates 25 of L-shape which straddle a bar 12 of the frame 11, a shaped plate 26 secured between the L-shaped plates 25 as by welding and a cover plate 27 which extends over the top of the bar 12 of the frame 11 and is secured by pairs of bolts 28 to each side plate 25 as indicated in FIG. 5. The shaped plate 26 includes a first inclined surface 29, a recess formed by a pair of oppositely inclined surfaces 30 and a stop 31. As indicated in FIG. 3, each inclined surface 29 is inclined downwardly in a direction from the outside to the inside of the ramp 24.

In order to weigh a bed-ridden patient 32 in the bed 10, the scale assemblies 14 are disposed on the floor F in general alignment with the bed frame 11 and particularly the wheels 13 attached to the bed frame 11. As indicated in FIG. 3, each scale assembly 14 is placed an equal distance from a ramp 24. Next, the bed 10 is rolled via the wheels 13 in the longitudinal direction indicated by the arrow, e.g. from foot to head so as to move the ramps 24 onto the rollers 17 of the respective scale assemblies 14 (see FIG. 4).

As the bed is being moved onto the rollers 17, the inclined surfaces 29 of the respective ramps 24 cause the bed 10 to elevate from the floor F. Continued movement of the bed 10 brings the recess defined by the surfaces 30 of each ramp 24 into a position directly over each roller 17 as indicated in FIG. 4. At this time, the stops 31 prevent further movement of the bed 10. The bed is then in position for a weighing operation.

As indicated in FIG. 4, when the bed 10 is in the weighing position, the wheels 13 are completely spaced from the floor F. At the same time, the total load of the bed 10 and patient 31 is transferred through the ramps 24 onto the rollers 17. As the load frames 16 move vertically downwardly, the mass of the bed 10 and patient can be read electronically in conventional manner and in particular, may be read out on the electronic read-out 22.

In order to demount the bed 10, the bed 10 is simply rolled to the right, as viewed in FIG. 4, from the position indicated to the position indicated in FIG. 3.

In positioning the scale assemblies 14 for mounting of the bed 10, each scale assembly 14 should be positioned adjacent the bed frame wheels 13 so that a total movement of only about six inches is necessary in order to mount the ramps 24 on the rollers 17. Once the bed 10 has been mounted on the scale assemblies 14, the sidewalls 25 of the ramps hold the bed 10 laterally while the recess or recesses hold the bed 10 longitudinally.

In order to facilitate mounting of the bed 10, each scale assembly 14 may be provided with a non-skid surface on the bottom, for example a plurality of rubber based legs 33.

Various modifications may be made in the scale assemblies 14 to accommodate the above procedures. For example, each ramp 24 need not be provided with a recess for receiving a roller 17. Instead, only one or two ramps may be provided with a recess while the others are flat.

Further, instead of using a rotatable roller, some other load support means may be used. For example, if a stationary block of curved shape were used, there would be no need for rotation; however, wear may require some rotation of the block from time-to-time.

The invention thus provides a scale which can be invention permits a bed, such as a wheeled hospital bed, to be simply pushed onto the scale assemblies while being elevated into a position for weighing.

Since the ramps employed on the bed provide for a smooth transition onto and off the scale assemblies, jarring of the bed by dropping off an elevated ramp or the like is avoided. Likewise, a minimal pushing effort is required to mount a bed on the scale assemblies as the bed does not require lifting onto the scale assemblies.

What is claimed is:

1. A scale assembly comprising
   a housing;
   a load frame movably mounted on said housing; and
   load support means including a pair of rollers mounted on said load frame at opposite ends thereof for receiving and elevating a load thereon.

2. A scale assembly as set forth in claim 1 wherein each roller projects above said housing for receiving a load thereon.

3. A scale assembly as set forth in claim 1 wherein said housing is of elongated shape and said load frame projects from laterally opposite ends of said housing.

4. A scale assembly as set forth in claim 1 which further includes a handle secured to said housing for transporting thereof.

5. In combination,
   a scale assembly having a housing for disposition on a floor, a load frame movably mounted in said housing, and a pair of rollers mounted on said load frame at opposite ends thereof; and
   a horizontally movable load having means for supporting said load on the floor and a pair of ramps thereon, each ramp being mounted on a respective roller for supporting said load thereon with said means elevated above the floor.

6. The combination as set forth in claim 5 wherein each ramp includes a first downwardly inclined surface for sliding onto and off a respective roller and at least one ramp having a recess adjacent said surface receiving said respective roller therein.

7. The combination as set forth in claim 6 wherein each ramp includes a pair of inclined surfaces defining said recess.

8. In combination,
   a scale having a pair of scale assemblies, each scale assembly having a housing for disposition on the floor, a load frame movably mounted in said housing, and a pair of rollers mounted on said load frame at opposite ends thereof; and
   a bed having a frame, means for supporting said frame on a floor and a plurality of ramps secured to said frame for supporting said bed on said rollers with said means elevated above the floor.

9. The combination as set forth in claim 8 wherein each ramp includes a first downwardly inclined surface for sliding onto and off a respective roller and at least one ramp having a recess adjacent said surface receiving said respective roller therein.

10. The combination as set forth in claim 9 wherein each ramp includes a pair of inclined surfaces defining said recess.

11. The combination as set forth in claim 8 wherein said means includes a plurality of wheels mounted on said frame, said wheels being disposed laterally outside of said rollers.

12. The combination as set forth in claim 8 wherein said ramps are mounted on said bed frame in spaced relation to permit rolling of said bed frame onto said rollers of said scale in a longitudinal direction of said bed.

13. The combination as set forth in claim 8 wherein each ramp is removably mounted on said bed frame.

14. In combination,
   a scale having a pair of scale assemblies, each scale assembly having a load frame and a pair of load support means mounted on said load frame at spaced apart points for transferring a loading thereto; and
   a bed having a frame and a plurality of ramps secured to said frame, each ramp including a downwardly inclined surface for sliding onto said load-support means to support said bed in an elevated manner.

15. The combination as set forth in claim 14 wherein each load-support means is a rotatable roller.

16. The combination as set forth in claim 14 wherein at least one ramp includes a recess for receiving a load-support means therein.

* * * * *

UNITED STATES PATENT AND TRADEMARK OFFICE
CERTIFICATE OF CORRECTION

PATENT NO. : 4,807,558

DATED : February 28, 1989

INVENTOR(S) : BURT L. SWERSEY

It is certified that error appears in the above-identified patent and that said Letters Patent is hereby corrected as shown below:

```
Column 1, line 35 change "Weighing" to -weighing-
Column 3, line 17 change "Which" to -which-
Column 4, line 2 change "Viewed" to -viewed-
Column 4, between lines 27 to 28 insert  -- readily used to
     weight a bed-ridden patient.  Further, the  --.
```

Signed and Sealed this

Twenty-fourth Day of October, 1989

Attest:

DONALD J. QUIGG

Attesting Officer

Commissioner of Patents and Trademarks